(No Model.)
J. W. RHODES.
PLANTER.
No. 355,715.  Patented Jan. 11, 1887.
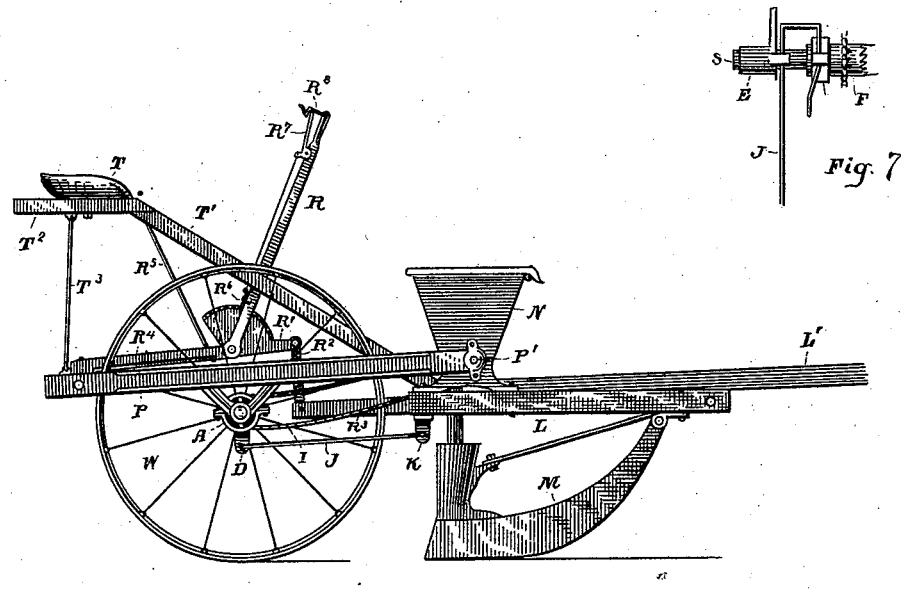
Fig. 1.
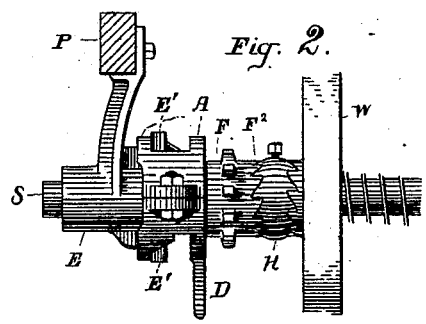
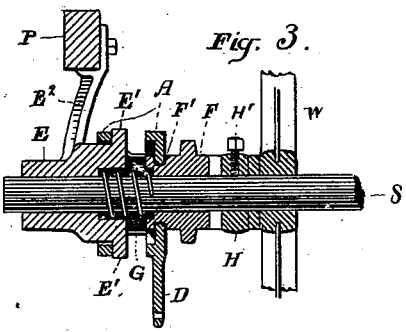
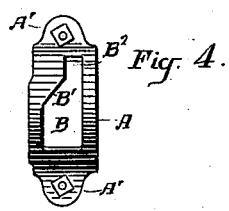
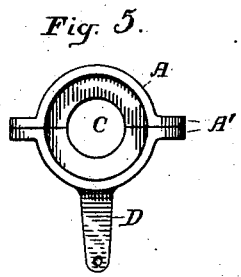
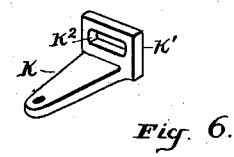
Witnesses:
L. M. Thurlow
A. Keithley
Inventor,
John W. Rhodes,
by A. B. Upham,
His Attorney.

UNITED STATES PATENT OFFICE.

JOHN W. RHODES, OF HAVANA, ILLINOIS.

PLANTER.

SPECIFICATION forming part of Letters Patent No. 355,715, dated January 11, 1887.

Application filed June 17, 1886. Serial No. 205,479. (No model.)

*To all whom it may concern:*

Be it known that I, JOHN W. RHODES, of Havana, in the county of Mason, State of Illinois, have invented an Improved Planter; and I do hereby declare that the following is a full, clear, and exact description thereof.

This invention is in the line of planting-machines in which the grooving and seed-dropping devices are connected to a frame, to which is hinged a second frame carrying the wheels for covering the dropped seed and actuating the said dropping device; and the particular points to which my invention relates are to the construction of means for enabling the raising of the grooving device out of contact with the ground, to automatically disconnect the seed-dropping device from the wheels driving the same.

The class of planters to which I have especially adapted my invention, and which I have shown in the drawings connected with this specification, is that of grain-drills; and in said drawings—

Figure 1 is a side elevation of a grain-drill provided with my improvement. Fig. 2 is an elevation, upon a larger scale, of the main portion of my arrangement for automatically disconnecting the driving from the driven mechanism. Fig. 3 is a central sectional view of the same. Fig. 4 is a plan view, and Fig. 5 a lateral elevation, of the oscillating cam-ring. Fig. 6 is a perspective view of the adjustable attaching-arm. Fig. 7 is a modified form of the disconnecting mechanism.

Referring to Fig. 1, L is the runner-frame of a grain-drill; M, the runners for grooving the ground; N, the seed-box; P, the sulky-frame, hinged at P' to said runner-frame L; W, the wheels mounted on the shaft S, which is loosely held in the bearings E, connected to said sulky-frame P, and I is the sprocket-chain for communicating the rotation of said wheels and shaft to the force-feed or seeding device in the box N. A seat, T, for the driver, is also provided, and a lever, R, for relatively flexing the runner-frame L and sulky-frame P, and thereby raising the runners M, the tongue L' being, of course, supported at its forward end by the horses attached thereto.

From the well-known construction of grain-drills, such as I partially show in Fig. 1, it is of course understood that there is a series of runners, M, side by side, a few inches apart, and a corresponding series of wheels, W, mounted on the shaft S, each runner having a wheel following in its track to cover the dropped seed. Each wheel W is loosely mounted on said shaft, and is provided with a laterally-toothed hub made to engage by a spring with a correspondingly-toothed collar, H, fast on the shaft.

This present construction of the grain-drill being understood, I will point out my addition thereto. The fixed collar H, which engages with the wheel W, nearest to one end of the shaft S, is provided with teeth upon its lateral face opposite to said wheel, and with said teeth are adapted to engage the teeth $F^2$ of the sprocket-wheel F, loosely mounted on said shaft, and about which passes the chain I, communicating with the force-feed devices in the box N. In the peripheral face of this sprocket-wheel is an annular groove, F', into which is inserted the edge of the opening C of the cam-ring A, the latter being made in two parts bolted together, as shown in Fig. 5. By moving said cam-ring toward or from the collar H the sprocket-wheel F is thereby made to engage with or be released from said collar. To automatically move this cam-ring by the elevation of the runners, I form in said cam-ring the cam-slots B, each having the cam-surface B' and locking-notch $B^2$, but opposite each to each. Said cam-ring overlapping the end of the bearing E, the lugs E', projecting from said hub, enter said slots B; hence by rocking the cam-ring A the lugs E' are met by the cam-surfaces B', and said lugs being fixed said cam-ring is forced toward the end of the shaft S and away from the collar H, thus disengaging the sprocket-wheel F from said collar. A coiled spring, G, on the shaft S, between the bearing E and sprocket-wheel F, serves to reunite the sprocket-wheel and collar when the cam-surfaces B' are rocked away from the lugs E'. By rocking the cam-ring sufficiently to bring the lugs E' into the notches $B^2$ the pressure of the spring G only serves to hold the same therein more securely, and thereby lock the sprocket-wheel F out of contact with the collar H.

From the under side of the cam-ring A projects the arm D, and to the end of said arm is pivoted a connecting-rod, J. The other end of said rod being joined to the attaching-arm K, fastened to the under side of the runner-frame L, the relative oscillation of the runner-frame L and sulky-frame P is enabled to rock the cam-ring, and the adjustment of parts is such that just as the runners M are raised clear of the ground the cam-ring is moved sufficiently to disengage the sprocket-wheel and collar, and thereby stop further sowing of the grain.

The distance from where the cam-surface B' begins to the large end of the slot B is such in each slot B that there is sufficient play for the lugs E' to keep the cam-ring A from being moved by the usual slight rocks given thereto by the passage of the grain-drill over ordinarily uneven ground.

In fastening the attaching-arm K to the runner-frame L, I usually form it with an elbow-plate at its upper end, having a slot, K², therein, through which passes the securing-bolt. This makes it possible to adjust the relative movements of the grain-drill frames and the cam-ring A.

A further improvement which I have effected in my grain-drill consists in the means for enabling the seat T to be adjusted in position toward or from the front. This I accomplish by rigidly securing to the upper end of the seat-support T' a backwardly-extending bar, T², having different bolt-holes therein for receiving the bolt that holds the seat T thereto. By removing the securing-bolt and sliding the seat backward or forward, and reinserting said bolt, the position of said seat can be readily adjusted to accommodate a driver of any weight. This is quite an important consideration, since, the seat being located back of the wheels W, a heavy driver tends more than a lighter one to elevate the runner-frame L, and thereby keep the runners M from sinking as deeply in the ground.

The arrangement of the seat-support just described is shown and claimed in another application of mine filed at the same date as this.

To raise and lower the runners the operating-lever R is pivoted to the front end of the bar R⁴, having its rear end fastened to the frame P, said front end being supported by the rod R⁵, attached thereto and to the seat-support T'. The arm R', also pivoted to the front end of the bar R⁴ and provided with means for locking it rigid with the operating-lever R, is connected by the link R² to the end of the beam R³, projecting rearwardly from the runner-frame L; hence by pulling the operating-lever R backward the runner-frame L, and consequently the runners, are raised. By pushing said lever away from the seat T the runners M are pressed into the ground.

When in use, the unevenness of the ground causes the runner-frame and sulky-frame to relatively oscillate, and hence if the arm R' and the lever R are fastened together said lever is continuously vibrating. This being objectionable, I have the arm R' furnished with a notched segment-iron, with which a draw-bolt connected with the lever R engages. Said draw-bolt R⁶ is connected by a small rod to the grip-lever R⁷ at the upper end of the lever R. A latch, R⁸, is connected to the end of the lever R and adapted to engage with the grip-lever R⁷ when the same is repressed to disengage the draw-bolt R⁶ from the notched segment-plate of the arm R'. This enables said arm and lever to be disconnected, so that the movements of the said arm during the travel of the planter over uneven ground shall not affect said lever.

Instead of mounting the cam-ring A and the remainder of the disconnecting mechanism upon the shaft S, as shown in the drawings, the sprocket-wheel F can be made fast upon said shaft and said disconnecting mechanism mounted upon the driven shaft of the force-feed, the rod J being attached to the bearing E at its rear end and to the cam-arm D at its front end. The construction and operation of such a modification is substantially equivalent to that before described, the parts being simply reversed.

A simplification of the mechanism is that shown in Fig. 7. This consists in having the end of the rod J suitably bent, and passing the same through eyes connected with the bearing E and a collar mounted in the groove F' of the sprocket-wheel F.

I am aware that prior to my invention an arrangement has been devised whereby the raising of the runner-frame from the ground automatically releases the seeding device from the driving mechanism, so that I do not broadly claim the same.

What I claim as my invention, and for which I desire Letters Patent, is as follows, to wit:

1. The combination, in a planter, of the runner-frame, the sulky-frame hinged thereto, the shaft carried by said sulky-frame, the wheels mounted on said shaft, the sprocket-wheel loosely mounted on said shaft, the seeding device connected with the runner-frame, the sprocket-chain joining said sprocket-wheel to said seeding device, the clutch for fastening said sprocket-wheel on its shaft, the cam-ring A, having the arm D and the cam-slots B, the lugs E', projecting radially into said slots from a fixed point, and the rod J, joining said arm D to the runner-frame, said cam-ring being connected to said clutch and adapted by its engagement with said lugs to release said sprocket-wheel from the clutch when the cam-ring is oscillated, substantially as set forth, for the purpose specified.

2. In a planter, the runner-frame, the sulky-frame hinged thereto, the shaft and wheels thereon, the toothed collar H, fixed on said shaft, the toothed sprocket-wheel F, loosely mounted on said shaft and engaging with said collar and having the annular groove F'', the seeding device connected with the runner-frame, and the chain joining said sprocket-wheel to the seeding device, in combination with the cam-ring A, having the opening C, encircling said groove F', and formed with the cam-slots B and the arm D, the bearing E, for one end of the shaft, the lugs E', projecting from said bearing into said cam-slots, the spring G, for elastically separating said bearing and sprocket-wheel, and the rod J, connecting said arm D and the runner-frame, substantially as and for the purpose set forth.

3. In a planter, the combination, with the grooved sprocket-wheel and its shaft, of the cam-ring A, formed in two parts secured together, as set forth, and having its opening encircle said groove, for the purpose specified.

4. In a planter, the combination, with the runner-frame and the sulky-frame hinged thereto, of the bar $R^4$, connected to the sulky-frame, and having its front end supported near the shaft of the sulky-frame, the operating-lever R and the arm R', both pivoted to the front end of said bar $R^4$, the lock for securing together said lever and arm, the beam $R^3$, projecting rearwardly from the said runner-frame, and the link joining said arm and beam, substantially as and for the purpose set forth.

5. In a planter, the combination, with the runner-frame and the sulky-frame hinged thereto, of the seat-support, the bar connected to the sulky-frame, the rod $R^5$, joining the front end of said bar $R^4$ to the seat-support, the operating-lever R and the arm R', both pivoted to the front end of said bar, the lock for securing together said lever and arm, the beam $R^3$, projecting rearwardly from the runner-frame, and the link joining said arm and beam, as described.

In testimony that I claim the foregoing invention I have hereunto set my hand and seal, this 27th day of May, 1886.

JOHN W. RHODES. [L. S.]

Witnesses:
A. B. UPHAM,
A. KEITHLEY.